Aug. 25, 1959     T. H. WIANCKO     2,901,673
RELAY CIRCUIT Filed Dec. 14, 1954                            5 Sheets-Sheet 1

THOMAS H. WIANCKO,
INVENTOR.

BY Reed C. Lawlor
ATTORNEY.

Aug. 25, 1959 T. H. WIANCKO 2,901,673
RELAY CIRCUIT
Filed Dec. 14, 1954 5 Sheets-Sheet 3

United States Patent Office 2,901,673
Patented Aug. 25, 1959

2,901,673

RELAY CIRCUIT

Thomas H. Wiancko, Altadena, Calif.

Application December 14, 1954, Serial No. 475,041

24 Claims. (Cl. 315—228)

This invention relates to improvements in electrical circuits that employ resonant circuits including saturable reactors, and particularly to improvements in bi-stable resonant circuits employing saturable reactors.

It has long been known that if a low amplitude alternating current is flowing in the secondary winding of a saturable reactor, the inductance of the secondary winding remains high, but if a large amplitude alternating current flows through the secondary winding the inductance of the secondary winding remains low. Attempts have previously been made to take advantage of such phenomena by connecting such a secondary winding in a resonant circuit that is supplied with energy from a source of alternating current of fixed frequency. More particularly, attempts have been made to employ such resonant circuits as bi-stable sections of flip-flop circuits and counters in such a way that each successive pulse applied to the flip-flop circuit or to the counter causes the high current flowing in one of the resonant circuits to fall to a low value and to cause the low value of current in a certain other resonant circuit to increase to a high value and to remain there. Great difficulty has been experienced in attempting to employ such bi-stable sections. In particular, the operation of such units has been found to be very sensitive to the duration and frequency and amplitude of pulses applied. Furthermore, prior art counters employing such circuits have proved to be very unreliable in counting, probably because of the difficulty in making all units of the counter identical within close tolerance limits.

The principal object of this invention is to provide a bi-stable resonant circuit employing a saturable inductor as one element thereof, which is free of the foregoing difficulties, and which can be operated reliably over a wide range of pulse intervals, a wide range of pulse durations, and a wide range of pulse amplitude.

In addition, it is an object of this invention to provide such a bi-stable unit which is highly reliable over a wide range of variation of applied alternating voltage of both amplitude and frequency.

Another object of this invention is to provide such a bi-stable resonant circuit which produces a voltage at its output which has a widely different value when the resonant circuit is active from the value that it has when it is inactive.

Another oject of this invention is to provide an improved system for energizing glow tubes to indicate whether or not a bi-stable circuit is active or inactive.

The foregoing and other objects of the invention will become apparent from the following specification, taken in connection with the accompanying drawings, wherein the invention is embodied in several different forms. In the drawings.

In the specification and claims, the abbreviations "A.C." and "D.C." have their customary meanings, namely, alternating current and direct current respectively.

Figure 1:
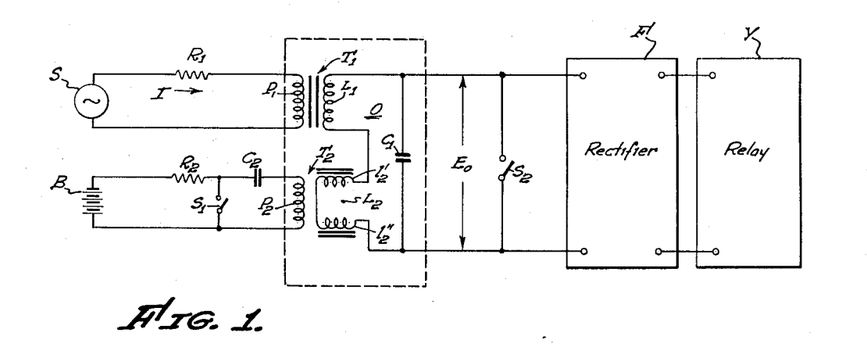
Figure 1 is a circuit diagram of an embodiment of the invention, in which a relay is controlled.

Referring first to Fig. 1, there is illustrated a simple relay control circuit embodying this invention. In this circuit, a relay Y is controlled in accordance with the state of a resonant circuit O comprising a condenser $C_1$ connected in series with a linear inductor $L_1$ and a saturable inductor $L_2$. The linear inductor $L_1$ is formed by the secondary winding of a non-saturating transformer $T_1$. Energy at radio frequency such as 480 kc.p.s. (kilocycles per second) is supplied to the resonant circuit O from a source S through a resistor $R_1$ to the primary winding $P_1$ of transformer $T_1$.

The saturable inductor $L_2$ comprises two substantially identical saturable reactor elements $1_1'$ and $1_2''$. These two reactor elements $1_2'$ and $1_2''$ are provided with saturable cores and the cores are mounted within a common saturating winding $P_2$. The two reactor elements $1_2'$ and $1_2''$ are so wound and connected that saturable reactor, or "transformer" unit, $T_2$ formed by them with the saturating winding $P_2$ has, in effect, a zero voltage ratio; that is the mutual inductance between the secondary winding formed by the saturable inductor $L_2$ and the primary winding formed by the saturating winding $P_2$ of the saturable reactor $T_2$ is substantially zero. Thus, changes in current flowing through the saturating winding $P_2$ induce substantially no voltage across the saturable inductor $L_2$. However, the current in the saturating winding $P_2$ changes the effective permeability of the cores of the reactor elements thereby affecting the inductance of the saturable inductor $L_2$. This inductance is realtively large when the cores are unsaturated, that is, when the current through the saturating winding $P_2$ is relatively small or zero, and is relatively small when the cores are saturated, that is, when the current through the saturating winding is relatively large.

Figure 2:
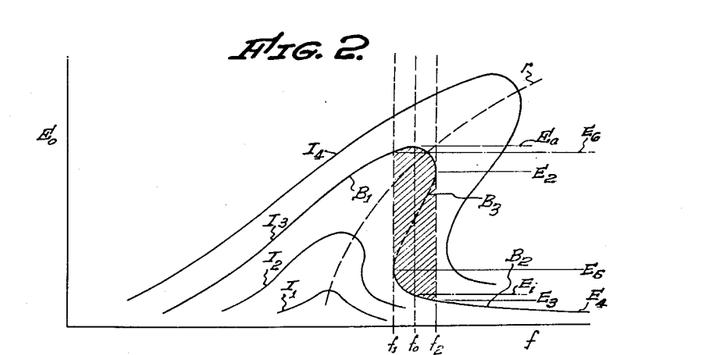
Fig. 2 is a graph employed in explaining certain characteristics of a resonant circuit embodying this invention.

To aid in understanding the operation of this invention, it is helpful to consider the relationship between the output voltage $E_0$ appearing across the condenser $C_1$ and the current I in the primary winding $P_1$ under different conditions. A graph showing such relationships at different frequencies is illustrated in Fig. 2. There, it will be noted that a series of curves represent the variation of output voltage $E_0$ in terms of the frequency of the source S for different successive values of input current $I_1$, $I_2$, $I_3$, and $I_4$. The various points of increasing magnitude of these graphs corresponding to resonance at different values of input current I are indicated by the dashed line $r$. As employed here, the resonant frequency of the circuit for any specific value of input current I is the frequency at which the combined inductive reactance of the inductors $L_1$ and $L_2$ is equal to the capacitive reactance of the condenser $C_1$.

In Fig. 2, it will be noted that when the input current I is relatively small having a value such as $I_1$, a resonance curve of conventional configuration is obtained, but as the input current I increases through successive values $I_1$, $I_2$, $I_3$, $I_4$, the character of the resonance curve departs from conventional configuration. More particularly, when the input current I has a large value, such as $I_3$ or $I_4$, the graphs disclose that for certain frequencies at high values of input current I, three values of output voltage $E_0$ appear. The action of the resonant circuit O occurring when the input current I is maintained substantially constant at a relatively high value such as $I_3$, while the frequency $f$ of the source S is varied, may best be understood by considering a specific example.

Assume, for purposes of explanation, that the input current $I_3$ is constant, while the frequency of the source S is varied. If the frequency $f$ is gradually increased, starting from zero, the output voltage $E_0$ gradually rises along the upper branch $B_1$ of the curve finally reaching a maximum value $E_a$. Further increase in the exciting frequency causes the output voltage to decrease along the upper branch $B_1$ of the curve until it reaches a value $E_2$ where the slope of the graph is vertical. Further increase in frequency causes the output voltage to drop or snap suddenly from the value $E_2$ to a value $E_3$ on the lower branch $B_2$ of the curve. Further increase in frequency causes the output voltage to decrease further to other values on the lower branch $B_2$ of that curve. Thereafter, as the frequency is decreased, commencing from a point $E_4$ on the lower branch $B_1$ of the curve, the output voltage increases gradually, finally reaching a value $E_5$ where the slope of the curve is again vertical. At this point, the voltage snaps or changes rapidly to a value $E_6$ on the upper branch of the curve. Thereafter, as the frequency continues to decrease, the output voltage $E_0$ also decreases along the upper branch $B_1$.

It is to be noted that the graph $I_3$ is three-valued over a range of frequencies $f_1$ to $f_2$, but that operation is stable only at the upper and lower values of voltage. In the practice of this invention, the current in the primary winding $P_1$ and the frequency of the source are set at such values that they lie in such a two-value region of operation of the circuit as indicated by the cross-hatched area of Fig. 2. Such a circuit is bi-stable. For reasons which will appear hereinafter, the condition of operation of the resonant circuit O corresponding to the two branches $B_1$ and $B_2$ are referred to as the active and inactive states respectively.

In the present invention, an inductor $L_1$ having a high Q is employed and its value is so selected that at the frequency $f_0$ at which the circuit is operated, the inductances of the secondary winding $L_1$ and the saturable inductor $L_2$ satisfy the following conditions:

(1) In the active state
$$L_{2a} < L_1$$
(2) In the inactive state
$$L_{2i} > L_1$$

In these equations $L_{2a}$ and $L_{2i}$ represent the values of the inductance $L_2$ of the saturable inductor in the active and inactive states, respectively, while $L_1$ represents the inductance of the secondary winding $L_1$. Furthermore, for optimum operation, the values of $L_1$ and $L_2$ are so chosen that a maximum voltage $E_0$ corresponding to point $E_a$ of Fig. 2 occurs when the circuit is active at frequency $f_0$. The inductor $L_1$ is so designed that it remains unsaturated in both the active and inactive state and the value of its inductance is substantially the same in both states. However, the value of the inductance $L_2$ of the saturable inductor $L_2$ in the active state is smaller than its value in the inactive state. The Q of the linear inductor $L_1$ is relatively high while the Q of the saturable inductor is relatively low. Under these conditions, it will be noted that in the active state, the total inductance $L_1 + L_{2a}$ is slightly smaller than that required for resonance and the Q of the circuit is high, while in the inactive state, the total inductance $L_1 + L_{2i}$ is considerably greater that that required for resonance and the Q of the circuit is low. Expressed differently, if L is the total value of inductance $L_1 + L_2$ required for the circuit O to resonate at frequency $f_0$ $$L_1 + L_{2a} \sim L$$
but
$$L_1 + L_{2a} - L << L_1 + L_{2i} - L$$

With such an arrangement, the ratio of output voltages for the active and inactive conditions is very high and the width of the frequency band $f_2 - f_1$ over which bi-stable operation occurs is increased compared with an arrangement in which such inductor $L_1$ is omitted.

One way in which the resonant circuit O may be employed to control a relay Y is illustrated in Fig. 1. In the embodiment of the invention illustrated in Fig. 1, a battery B is connected in series with a resistor $R_2$ across a switch $S_1$ and the switch $S_1$ is connected to the saturating winding $P_2$ through a coupling condenser $C_2$. A rectifier F is connected between the parallel resonant circuit O and the relay Y so that the output voltage $E_0$ appearing across the resonant circuit is rectified to operate or restore the relay Y according to whether the value of the output voltage $E_0$ is large or small. A switch $S_2$ is connected in a circuit in parallel with the output of the resonant circuit O and the input of the rectifier F. The switch $S_1$ is employed to activate, or trigger, the resonant circuit O to render it active and the switch $S_2$ is employed to de-energize or de-activate the resonant circuit O.

Assume that initially when the circuit shown in Fig. 1 is assembled and power is applied thereto that both switch $S_1$ and switch $S_2$ are open, and that the resonant circuit O is in its inactive state. While the circuit is in this condition, a relatively small voltage $E_0$ appears across the resonant circuit, this voltage being too small to cause the relay Y to operate. While the resonant circuit is in its inactive state, it may be rendered active by closing switch $S_1$. Thus, when switch $S_1$ is closed, a surge of current passes from the charged condenser $C_2$ through the saturating winding $P_2$, momentarily saturating the cores of the two reactor elements $1_2'$ and $1_2''$. The saturation of these cores causes the inductance of the saturable inductor $L_2$ to be reduced, thereby decreasing the total value of the inductive reactance in the resonant circuit O toward the value required for resonance. This action causes the current in the resonant circuit O to rise suddenly, the process continuing at a rapid rate until stable operation at point $E_a$ is attained. The alternating current flowing through the saturable inductor $L_2$ is sufficiently large to drive the cores of the reactor elements $1_2'$ and $1_2''$ to saturation during each half cycle. In this way, the average inductance of the saturable inductor $L_2$ is maintained at a low value even though the current flowing through the saturating winding $P_2$ has ceased and stable operation in the active state is maintained. It will be noted that if switch $S_1$ is either opened or closed while the resonant circuit O is active, the circuit will remain active.

While the resonant circuit O is in its active condition, it may be rendered inactive by closing the switch $S_2$ momentarily. When the switch $S_2$ is closed, the condenser $C_1$ is short-circuited, thereby "loading" the inductors $L_1$ and $L_2$ and causing the alternating current flowing through them to fall to a low value, far below the point at which the cores of the reactor elements $1_2'$ and $1_2''$ saturate. Thereafter, when the switch $S_2$ is opened and $C_1$ is thereby effectively reconnected in parallel with the inductors $L_1$ and $L_2$, the current in the resonant circuit O remains low and below the point of saturation of the inductor $L_2$. Thus, the resonant circuit O is returned to its inactive state. It will also be noted that the current in the resonant circuit could be reduced by breaking the connections of the resonant circuit momentarily.

The value of the output voltage $E_a$ in the active state is more than enough to operate relay Y, so that activation of the oscillator circuit O causes relay Y to operate. And the value of the output voltage $E_i$ in the inactive state is so low that operation of relay Y cannot be maintained, so that deactivation of the oscillator circuit O causes relay Y to restore. Thus with the foregoing arrangement, the relay Y may be repeatedly operated and restored by closing switch $S_1$ momentarily and closing switch $S_2$ momentarily. In the operation of the circuit as described, a pulse of current is flowed through the saturable winding $P_2$ for a time interval sufficient to maintain the cores of the reactor elements $1_2'$ and $1_2''$ saturated long enough for the resonant circuit to change from its inactive to its active state. The duration of the saturating current pulse and the duration of loading are of the order of a few periods of the alternating current impressed upon the resonant circuit O from the source S.

Figure 3:
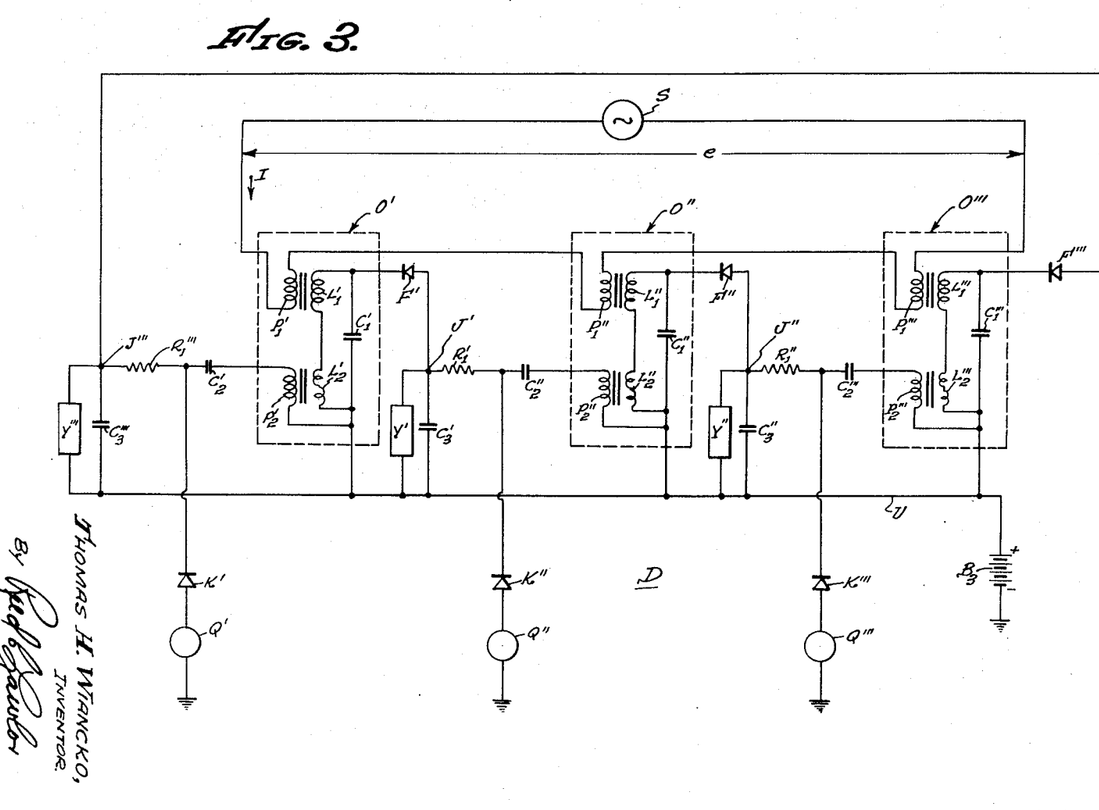
Fig. 3 is a circuit diagram of a decision circuit employing this invention.

The invention described herein may be employed in various circuits in which desired operations can be performed by means of bi-stable units. In Fig. 3, the invention is applied to a decision circuit; in Fig. 5, to a scale-of-ten ring counter, in Fig. 9, to a multiple section decade counter and in Fig. 10, a multiple section binary counter.

Except where otherwise indicated hereinafter, elements of various parts of the circuits shown in Figs. 3, 5, 9 and 10 which are similar to those shown in Fig. 1 are designated by the same symbols, except however, that the designations ', ", et al, are employed to distinguish different elements appearing in different similar parts of the same circuit. However, the designations ', ", et al. are sometimes omitted in describing the circuits of Figs. 3, 5, 9 and 10 where the description is applicable to all similar parts in the circuit in question.

Referring now particularly to Fig. 3, there are shown three pulse sources Q', Q" and Q'", which are employed to control relays Y', Y" and Y'". By means of a decision circuit D employing three resonant circuits O', O" and O'", a pulse applied from any one of the sources Q', Q" or Q'", operates a corresponding relay Y', Y" or Y'" if, and only if, a specific one of the other sources was the last to previously operate the decision circuit. More specifically, the decision circuit D is so designed that when relay Y' is operated and relays Y" and Y'" are restored, a pulse from either source Q' or source Q'" will be ineffective, but a pulse from source Q" will operate relay Y" and restore relay Y' without affecting relay Y'". Likewise, when relay Y" is operated and relays Y'" and Y' are restored, a pulse from either source Q" or source Q' will be ineffective, but a pulse from source Q'" will operate relay Y'" and restore relay Y" without affecting relay Y'. And, likewise, when relay Y'" is operated and relays Y' and Y" are restored, a pulse from either source Q'" or Q" will be ineffective, but a pulse from source Q' will operate relay Y' and restore relay Y'". The desired characteristic of the decision circuit D is obtained by arranging the three resonant circuits O', O" and O'" in sequence in a ring in such a way that only one of them can be operated at a time and so that when an active resonant circuit is restored to its inactive state, the next resonant circuit in sequence in the ring is rendered active.

In the decision circuit of Fig. 3, the primary windings $P_1'$, $P_1''$ and $P_1'''$ are connected in series across a regulated source S of high frequency A.C. voltage. The total voltage supplied by the source S is chosen to be of such a value that only one of the resonant circuits O', O" or O'" can be active at one time. To facilitate understanding how this result is attained, reference is made to Fig. 4, which is a graph representing the voltage drop $e_1$ across the primary $P_1$ of one of the resonant circuits $O_1$ as a function of the supply current I through the primary winding at a fixed frequency $f_0$. Here, it will be noted that as the input current I increases along the lower branch of the curve the primary voltage increases but remains relatively low. But as the input current passes the value I", the primary voltage $e_1$ suddenly jumps from a value $e_1$ on the lower branch to a value $e_2$ on the upper branch of the curve. As the input current I is decreased again to a value below I', the primary voltage suddenly drops from a value $e_3$ on the upper branch to a value $e_4$ on the lower branch of the curve. If the primary current is held at the value $I_3$, the primary voltage will be $e_5$ on the lower branch of the curve if the resonant circuit O is in the inactive state, or will be $e_6$ on the upper branch if the circuit is in the active state.

If $n$ primary windings $P_1$ are connected in series and supplied with a current $I_3$, and if one and only one resonant circuit is to be active, then the total supply voltage will be $$e = (n-1)\, e_5 + e_6$$

Furthermore, it can be shown that a number $n$ of resonant circuits which may be supplied with a voltage $e$ and still operate in such a way that one and only one resonant circuit will be active at a time, must satisfy the following equations:

$$e > ne_1$$
$$e < (n-2)\, e_4 + 2e_3$$

From these equations, it can be shown that the maximum number N of resonant circuits that may be so operated is determined by the relationship:

$$N < 2\frac{e_3 - e_4}{e_1 - e_4}$$

Figure 4:
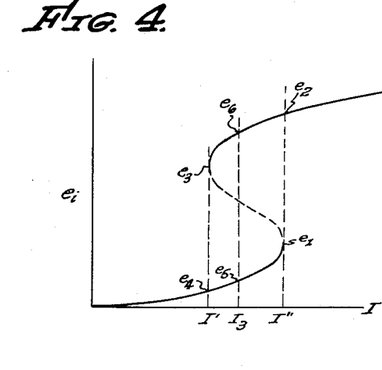
Fig. 4 is a graph employed in explaining certain characteristics of a resonant circuit of this invention.

Thus, it is seen that to permit the satisfactory operation of a large number of resonant circuits in the manner described, it is desirable for the lower branch of the curve to be made as flat as possible. It is to be understood that the shapes and proportions of the graphs shown in Figs. 2 and 4 are not intended to be a quantitative representation of what occurs with the specific resonant circuits described in detail herein, but have been drawn in such a way as to facilitate the explanation of the theory of operation. In fact with the specific elements described herein stable and satisfactory operation can be obtained by the use of many more than ten resonant circuits. In this particular case, $n=3$ and the value of the voltage $e$ that is supplied by the voltage source S is therefore set at $$e = 2e_5 + e_6$$

so that only one of the three resonant circuits will be active at any one time.

To operate the decision circuit D, pulses are applied from each of the pulse sources Q', Q" and Q'" through corresponding rectifiers K', K" and K'" and through the corresponding coupling condenser $C_2'$, $C_2''$ or $C_3'''$ to the saturating winding $P_2'$, $P_2''$ or $P_2'''$ of the corresponding parallel resonant circuit O', O" and O'", respectively. More specifically, pulses from pulse source Q' are applied through rectifier K' and coupling capacitors $C_2'$ to the saturating winding $P_2'$. Similarly, pulses from pulse source Q" are applied through rectifier K" and coupling capacitors $C_2''$ to the saturating winding $P_2''$, and similarly, pulses from pulse source Q'" are applied through rectifier K'" and coupling capacitors $C_2'''$ to the saturating winding $P_2'''$.

The lower ends of the three resonant circuits O', O" and O'" are connected to a common bus wire U which is maintained at a positive voltage with respect to ground by means of a battery $B_3$.

A rectifier F and a relay Y are connected across the output of each of the corresponding oscillator circuits O and the junction J between each of the rectifiers F and relay Y associated with each resonant circuit O is connected through a resistor $R_1$ to the coupling capacitor C associated with the next following resonant circuit in the group. Thus, rectifier F' and relay Y' are connected in the output of oscillator O', and the junction J' between rectifier F' and relay Y' is connected through resistor $R_1'$ to condenser $C_2''$. Similarly, rectifier F'' and relay Y'' are connected in the output of oscillator O'', and the junction J'' between rectifier F'' and relay Y'' is connected through resistor $R_1''$ to condenser $C_2'''$, and similarly, rectifier F''' and relay Y''' are connected in the output of oscillator O''', and the junction J''' between rectifier F''' and relay Y''' is connected through resistor $R_1'''$ to condenser $C_2'$. Condensers $C_3$ are connected in parallel with corresponding relays Y.

In effect the decision circuit D of Fig. 3, comprises three bi-stable decision units connected in a ring, each of which includes a resonant circuit O, a rectifier F, and a relay Y connected in its output and a rectifier K and a coupling capacitor $C_2$ connected at its input.

To understand the operation of the decision circuit of Fig. 3, it is convenient to consider a specific example. Assume, for example, that the voltage supplied by battery $B_3$ is 40 volts, and assume that when a resonant circuit O is active, the voltage impressed across the relay Y is —40 volts, but that the voltage developed across the same relay when its corresponding resonant circuit O is inactive is —2 volts.

Consider now the operation of the decision circuit D under the foregoing conditions starting from an initial condition in which the first resonant circuit O' is active and each of the other resonant circuits O'' and O''' is inactive and assume that pulses having an amplitude of +38 volts but of short duration are being supplied in rather random fashion from the three pulse sources Q', Q'' and Q'''. When the decision circuit D is in the condition just described, the junction J' is at ground potential and the junctions J'' and J''' are each at a voltage of +38 volts, that is, 38 volts above ground potential.

If the next pulse to arrive is one from source Q' it does not affect the decision circuit because no current flows through rectifier K'. Even if the positive pulse from source Q' exceeds 38 volts the resultant small surge of current through primary winding $P_2'$ would be ineffective since resonant circuit O' is already active and no increase in potential of junction J''' would effect resonant circuit O''' since it is already inactive. If the next pulse that arrives is one from pulse source Q''', the decision circuit D also remains unchanged, but for a different reason. If the voltage of the pulse from pulse source Q''' is +38 volts or otherwise does not exceed the voltage already existing at junction J'' no current can flow from the pulse source Q''' through the rectifier K'''. In such a case no current at all is impressed on the saturating winding $P_2'''$ and resonant circuit O''' remains inactive. Even if the voltage of the pulse arriving from pulse source Q''' is slightly larger than the voltage already existing at the junction J'' only a slight surge of current is transmitted from the pulse source Q''' to the primary winding $P_2'''$. So long as the surge of current is too small to activate the resonant circuit O''', it remains inactive. In either event any change in potential at junction J'' has no effect, since resonant circuit O'' is already inactive.

But if the next pulse to be applied to the decision circuit D arrives from the pulse source Q'', a small current flows through rectifier K'' through resistor $R_1'$ to junction J' since this junction is at ground potential. At the same time, a rapid surge of current of relatively high magnitude is transmitted through the coupling condenser $C_2''$ and through the saturating winding $P_2''$ to ground. The current pulse applied to the saturating winding $P_2''$ saturates the saturable inductor $L_2''$ causing the inactive resonant circuit O'' to become active. At the same time, since only one resonant circuit can be active at a time, and saturation of the saturable inductor $L_2''$ is maintained for at least several cycles of the applied high frequency current, the resonant circuit O' becomes inactive.

Thus, when a positive pulse is applied from pulse source Q'' active resonant circuit O' becomes inactive and the relay Y' and its output is restored. At the same time, the resonant circuit O'' becomes active and the relay Y'' at its output is operated. In a similar manner, when resonant circuit O'' is active, if the next pulse to arrive is from source Q' or Q'' the condition of the decision circuit is not altered. But if the next pulse arrives from pulse source Q''', resonant circuit O'' is de-activated and its relay Y'' restored and at the same time resonant circuit O''' becomes active and the relay Y''' in its output is operated. Likewise, when resonant circuit O''' is active, if the next pulse to arrive is from source Q'' or Q''' the condition of the decision circuit is not altered. But if the next pulse arrives from source Q', resonant circuit O''' is de-activated and its relay Y''' is restored and at the same time resonant circuit O' becomes active and the relay Y' in its output is operated.

It is to be noted that in considering the operation of the decision circuit D, no account was taken of the possibility that pulses might be impressed on the decision circuit simultaneously from two sources. As a matter of fact, if this occurs, there is some uncertainty as to how the circuit would respond especially if the various elements in the different resonant circuits and the elements associated with the respective resonantt circuits are not evenly balanced and if the pulses are applied for any substantial period. The manner in which such difficulty is overcome can best be understood by considering the operation of the ring counter of Fig. 5 in which a number of resonant circuits are employed in a ring and pulses are applied to all of them simultaneously.

Figures 5, 6, 7:
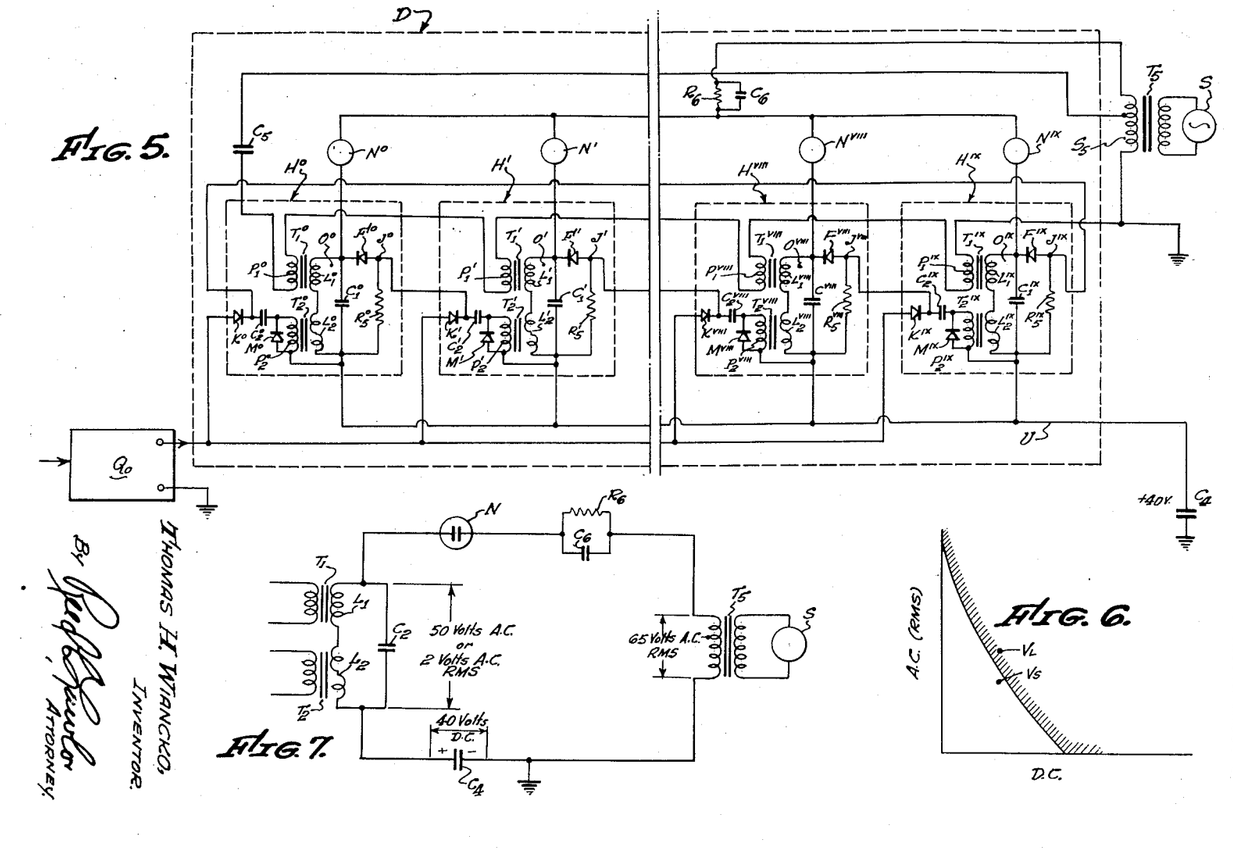
Fig. 5 is a circuit diagram of a scale-of-ten counter embodying this invention.
Fig. 6 is a graph employed to explain the operation of the glow tubes.
Fig. 7 is a fragmentary circuit employed in the explanation of the operation of the glow tubes.

In the scale-of-ten ring counter of Fig. 5, ten bi-stable units H°, H', H'' . . . $H^{viii}$, $H^{ix}$ are connected together in sequence. Each of the bi-stable units H comprises a resonant circuit O as previously described including a condenser $C_1$ connected in series with the linear inductor $L_1$ formed by the secondary winding of a non-saturating transformer $T_1$ and the saturable inductor $L_2$ formed by the secondary winding of a saturable reactor $T_2$. The lower ends of the resonant circuits O are all connected to a common bus wire U which is connected to ground through a condenser $C_4$. The primary windings $P_1°$, $P_1''$ . . . of the transformers $T_1°$, $T_1'$ . . . are connected together in series through a capacitor $C_5$ to a part of the secondary winding $S_5$ of a transformer $T_5$ in the output of a regulated radio-frequency voltage supply S.

One end of the secondary winding $S_5$ is grounded. The upper ends of the resonant circuits O, O' . . . $O^{ix}$ are connected through corresponding glow lamps N°, N' . . . $N^{ix}$ to the ungrounded end of the secondary winding $S_5$, the glow tubes being connected thereto through a common ballast resistor $R_6$ that is shunted by a condenser $C_6$. The voltage applied from the secondary winding $S_5$ to the glow tubes N is such that the only glow tube that lights at any one time is that which is connected to the upper end of the active resonant circuit as explained in more detail hereinafter.

A diode F and a resistor $R_5$ is connected across the output of each of the resonant circuits O. The junction J between the diode F and resistor $R_5$ of each bi-stable unit H is connected through a coupling condenser $C_2$ to the saturating winding $P_2$ of the next following bi-stable unit in the ring. The output of a source $Q_0$ of random pulses is applied to each of the coupling condensers $C_2$ at the junction J through a corresponding rectifier K. A rectifier M which is employed for a special purpose is connected across the saturating winding $P_2$ of each of the saturable reactors.

The cathode of each of the diodes F is connected to the upper end of its associated resonant circuit and the anode is at the corresponding junction J. Accordingly, when any resonant circuit O is operating, the junction J becomes negative relative to the lower end of the resonant circuit which is connected to the bus wire U, the voltage across the resistor $R_5$ being relatively high, say 40 volts, when the resonant circuit is active and relatively low, say 2 volts, when it is inactive as in the case of Fig. 3. Accordingly, when a resonant circuit is in an active state, its junction J is at ground potential as in the circuit of Fig. 3, but when a resonant circuit is inactive, its junction J is at a potential of +38 volts also as in the case of the circuit of Fig. 3.

The voltage $e$ applied across the primary windings $P_1$ is set at such a value so that one and only one resonant circuit is active at any one time. In this case, this value is $$e = 9e_5 + e_6$$

In practice, the value of $C_5$ is so chosen that the reactance of $C_5$ is much smaller than the impedance of the ten primary windings $P_1$. In this case, greater latitude in the tolerance of the supply frequency $f_0$ is attained.

In the counter of Fig. 5, one and only one resonant circuit O is active at a time. The voltage developed across the resistor $R_5$ in the output of the active resonant circuit charges the condenser $C_4$ through the rectifier K of the next following resonant circuit in the ring circuit and through the source $Q_0$. Thus, for example, if resonant circuit O° is active, and if a potential of 40 volts is developed across its output resistor $R_5°$, the condenser $C_4$ is charged to +40 volts through rectifier K' and through the pulse source $Q_0$. Since one resonant circuit is always active, the charge on condenser $C_4$ is maintained indefinitely, thus eliminating the need of a battery $B_1$ as shown in Fig. 3. The output of the active unit of the ring circuit may be employed to maintain the voltage on the bus wire U in this manner so long as the average time between pulses appearing at the output of the pulse source $Q_0$ is large compared to the average duration of the pulses. However, if this condition is not met, the condenser $C_5$ may be replaced by a battery.

To illustrate the operation of the ring counter of Fig. 5, assume by way of example that the resonant circuit O° is active and that the other resonant circuits O' ... O$^{ix}$ are inactive. In this case, junction J° is at ground potential whereas the other junctions J' ... J$^{ix}$ are at a potential of +38 volts with respect to ground. The glow tube N° is illuminated, but the other glow tubes N' ... N$^{ix}$ are dark.

When the next pulse is applied from the source $Q_0$ to the counter, current flows through the rectifier K', but no current flows through the other rectifiers K°, K'' ... K$^{ix}$. The reason for this is that just prior to the application of the pulse to the circuit the cathode terminal of the rectifier K' is at ground potential, but the cathode terminals of the other rectifiers K°, K'' ... K$^{ix}$ are at a potential of +38 volts with respect to ground. Accordingly, when a pulse of 40 volts is applied from the output of the pulse source $Q_0$ no current flows through the rectifiers K°, K'' ... K$^{ix}$, but a substantial current does flow through rectifier K'. The current pulse flowing through the rectifier K' flows to the bus wire U through the coupling condenser $C_2'$ and the saturating winding $P_2'$ of the second bi-stable unit H'.

The application of the pulse to K' raises the potential of the junction J° to 40 volts, almost instantly, thus loading the output of the resonant circuit O° thereby de-activating this resonant circuit. In effect, the condenser $C_1°$ is momentarily short-circuited, thus causing the resonant circuit O° to change from its active state to its inactive state. The action of the positive potential appearing at junction J° in de-activating the resonant circuit O° is similar to the action of the switch $S_2$ in de-activating the resonant circuit of Fig. 1. Momentarily then, all of the resonant circuits O°, O' ... O$^{ix}$ are inactive, but for a short time interval current continues to flow through the saturating winding $P_2'$ of the second bi-stable unit E', but no current flows through the saturating windings $P_2°, P_2''$ ... $P_2^{ix}$. When the pulse impressed upon the counter from the output of the pulse source $Q_0$ is removed, magnetic energy stored in the field of the saturating winding $P_2'$ causes current to discharge through the rectifier M' connected across the input of the saturating winding $P_2'$. This current flows through the saturating winding $P_2'$ itself in the same direction as the current that was impressed thereon through the rectifier K'. Thus, when the pulse applied from the pulse source $Q_0$ is removed the saturable inductor $L_2'$ remains saturated momentarily while all the other saturable inductors $L_2°, L_2''$ ... $L_2^{ix}$ remain unsaturated. The voltage $e$ applied across the primary windings is too large to permit all of the resonant circuits to remain inactive, and it is too small for more than one resonant circuit to become active. Consequently, resonant circuit O' becomes active and remains active and the other resonant circuits O°, O'' ... O$^{ix}$ remain inactive.

Thus, the application of a pulse, from the pulse source $Q_0$ to the ring counter causes the bi-stable unit that is active at the time to become inactive and the next following bi-stable unit in sequence in the ring to become active. Thus, as successive pulses are applied the corresponding glow tubes N°, N' ... N$^{ix}$ become illuminated in succession to indicate the accumulated number of pulses. It will be understood, of course, that the output of such a scale-of-ten ring circuit can itself be employed as a source for applying pulses to another scale-of-ten unit of similar construction in order to indicate a larger number of counts.

The manner in which the glow tubes N operate may be explained by reference to the graph of Fig. 6. In that graph, abscissae indicate the D.C. voltage applied to a glow tube and ordinates indicate the minimum R.M.S. value of the A.C. voltage that must be applied across a glow tube in series with such D.C. voltage to cause ignition of the glow tube. Here, it will be noted that as the D.C. voltage applied across the glow tube is increased, the R.M.S. value of the A.C. voltage required for ignition decreases. This kind of relationship exists where the frequency of the A.C. voltage is high compared with the reciprocal of the de-ionization time of the glow tube. In the circuit of Fig. 5, using neon bulbs manufactured by General Electric Company, a D.C. potential of 40 volts is applied to the glow tubes and the alternating current impressed thereon when its associated resonant circuit is active causes the neon bulb to glow but when that resonant circuit is inactive the alternating current is insufficient to make the neon bulb glow. The D.C. potential of 40 volts is applied from the condenser $C_4$ through the inductors $L_1$ and $L_2$ of each of the resonant circuits, across the glow tubes N, through the ballast resistors $R_6$, and through the secondary winding $S_5$, returning from the grounded end of the secondary winding $S_5$ to the grounded end of the condenser $C_4$. It will be noted that the D.C. potential at any junction J may change during the operation of the different bi-stable units. This, however, does not affect the D.C. voltage applied to the glow tubes N because the D.C. impedance of the windings $L_1$ and $L_2$ is very low compared with the value of the resistance of resistor $R_5$. Such a path through which voltage applied to a single glow tube N is indicated in Fig. 7.

Each transformer $T_1$ is so connected that the A.C. voltage developed across its secondary winding adds in phase with the A.C. voltage applied from secondary winding $S_5$ to increase the A.C. voltage across the corresponding glow tube N. For this reason, when a resonant circuit is active, the A.C. voltage impressed upon the corresponding glow tube by the resonant circuit and the secondary winding $S_5$ is large, but when a bi-stable unit is inactive, the A.C. voltage impressed upon the corresponding glow tube by the resonant circuit and the secondary winding $S_5$ is small. By setting the value of the voltage impressed upon the glow tubes from secondary winding $S_5$ so that the large voltage value $V_L$ and the small voltage value $V_S$ lie on opposite sides of the graph of Fig. 6, a glow tube connected to any of the resonant circuits is illuminated only when that resonant circuit is active and is dark only when the resonant circuit is inactive. With the arrangement described one and only one glow tube is illuminated at a time. But it will also be understood that the connections to the primary windings $P_1$ of the transformers $T_1$ may be reversed if it is desired to cause the glow tube associated with any resonant circuit to be dark when the circuit is active and to be illuminated when the associated circuit is inactive. In this case one and only one glow tube is dark at a time.

In a specific embodiment of the invention the glow tube N was an NE2 neon bulb manufactured by General Electric Company. In this, for satisfactory operation, the voltage supplied to the neon bulbs by the secondary winding $S_5$ was approximately 65 volts R.M.S. and the voltage generated across the resonant circuit was approximately 50 volts peak value. The power required of the radio frequency supply S is only about one watt.

By employing a D.C. voltage to bias the glow tubes N and by utilizing the change in A.C. voltage of the resonant circuits to ignite and de-ignite the glow tubes, a highly simplified and inexpensive arrangement is obtained for indicating the number of pulses accumulated.

It is to be noted that the amplitude of the applied pulses need not be equal to the maximum potential developed at the junctions J. In particular, it is to be noted that when a resonant circuit O is active, the voltage at the junction J is only about 2 volts. Accordingly, so long as the amplitude of the pulse applied exceeds 2 volts by a substantial factor a substantial pulse flows through the rectifier K, raising the voltage of the junction J and partially loading the associated active resonant circuit O. Such partial loading changes the active resonant circuit to an inactive state at the same time a saturating current is impressed on the saturating winding $P_2$ of the next resonant circuit in sequence causing it to become active.

Furthermore, if the amplitude of a pulse applied exceeds 40 volts, a large pulse of current flows through the saturating winding $P_2$ connected in the output of the active resonant circuit O, but only small pulses of current flow through the saturating windings connected in the outputs of the inactive resonant circuits. For this reason, a larger amount of magnetic energy becomes stored in the saturable reactor through which the larger current flows, while only a small amount of magnetic energy is stored in the saturable reactor through which the small currents flow. Accordingly, when the applied pulse ceases, a longer time is required to discharge the magnetic energy from the highly charged reactor than from the other reactors. For this reason, even though all of the reactors may store magnetic energy, the reactor in the output of the active resonant circuit remains saturated longer than the other reactors so that only the next resonant circuit in the sequence becomes active.

It is to be noted that when positive pulses are being employed to trigger the resonant circuits, as described above, the anode terminal of the rectifier M is connected to the end of the saturating winding $P_2$ that is connected to the bus wire U, and that the cathode end of the rectifier M is connected to the other end of the saturating winding $P_2$.

It is convenient to distinguish between the charging time constant of a saturable reactor $T_2$, that is, the time required for a current of saturating magnitude to develop in the saturating winding $P_2$ from the discharge time constant, that is, the time required for magnetic energy stored in the primary winding $P_2$ to fall below a predetermined small value below which the current in the saturating winding is unable to maintain saturation. The charging time constant of the circuit connecting the source Q with a saturating winding $P_2$ depends on the value of the coupling condenser $C_2$, the self-inductance of the saturating winding and the impedance connected between junction J and ground, that is, the forward resistance of the rectifier K and the impedance of the source Q. This time constant is made very short, of the order of 1 $\mu$sec. or less, so that when a pulse is applied the active resonant circuit becomes inactive during the interval of the shortest pulses to be counted.

The discharging time constant is determined by the inductance of the saturating winding and the forward resistance of the rectifier M connected across it. The discharging time constant is set at such relatively large value that it exceeds the maximum duration of any of the pulses which are to be counted, so as to be certain that magnetic energy will remain stored in the proper saturating winding $P_2$ after the pulse has been removed. However, this discharge time constant is also made small compared with the intervals between pulses so that no substantial saturating current is flowing when the active resonant circuit is to be deactivated. In the specific circuit described, this time constant is about 10 $\mu$sec.

Figure 8:
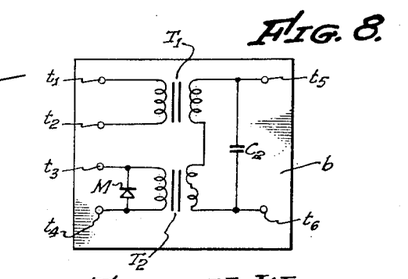
Fig. 8 is a schematic diagram of a resonant circuit unit embodying this invention.

In practice, each of the resonant circuits, together with certain essential associated parts are manufactured, assembled and sold in the form of sealed units. Such a sealed unit is illustrated schematically in Fig. 8. This unit includes a non-saturating transformer $T_1$, a saturating transformer $T_2$, a resonating condenser $C_2$ and a rectifier M connected together in the manner previously described herein and six terminals $t_1$, $t_2$, $t_3$, $t_4$, $t_5$ and $t_6$ all arranged on a base $b$. Terminals $t_1$ and $t_2$ are provided to connect the primary winding $P_1$ of the transformer $T_1$ to a source of radio-frequency voltage. Terminals $t_3$ and $t_4$ are provided to permit application of saturating pulses from a pulse source to the saturating winding $P_2$ of the saturable reactor $T_2$, and terminals $t_5$ and $t_6$ are provided to connect the output of the resonant circuit O to a utilization circuit such as a rectifier and relay. Bi-stable units of the type illustrated in Fig. 8 are arranged in individual housings with the terminals $t_1$, $t_2$, $t_3$, $t_4$, $t_5$, and projecting from a base $b$ to facilitate their ready adaption and use in various kinds of circuits in which bi-stable units are to be employed.

In the specific embodiments of the invention described herein, the driving frequency $f_0$ was 480 kc. p.s.

Each of the non-saturating transformers $T_1$ employed in a typical unit comprises a primary winding consisting of 20 turns and a secondary winding consisting of 50 turns wound on a straight cylindrical soft iron core having a length of 0.5″ and a diameter of 0.25″. In such typical unit the characteristics of the secondary winding at the driving frequency are as follows:

$$L_1 = 40 \ \mu H$$
$$Q = 20 \text{ (at 480 kc. p.s.)}$$

Each of the reactor elements $1_1$ and $1_2$ employed in this same typical unit comprises a single layer solenoid wound on a permalloy core having a length of 0.5″ and a diameter of 0.040″. The two reactor elements $1_1$ and $1_2$ are placed side-by-side within a saturating winding $P_2$ consisting of 1,000 turns, and connected in such a way that a current in $1_1$ and $1_2$ will induce no voltage in the saturating winding $P_2$. The characteristics of the saturable inductor $L_2$ so formed is $L_2 = 10 \ \mu H$ when the resonant circuit is active
$L_2 = 60 \ \mu H$ when the resonant circuit is inactive, and
$Q = 2$ The condenser $C_2$ had a capacity $$C_2 = 0.002 \ \mu F$$

With this arrangement the resonant circuit O has a resonant frequency of about 500 kc. p.s. when the circuit is active. Also, when active, the effective value of Q is approximately $$Q_{eff} = 7.1$$

But when the resonant circuit O is inactive its resonant frequency departs considerably from 480 kc. p.s. and its effective Q in this condition is $$Q_{eff}=3.1$$

The fact that the resonant frequency of the resonant circuit departs considerably from the driving frequency $f_0$ when the resonant circuit is inactive, and the fact that the Q of the resonant circuit is much lower in this condition, both contribute to producing a large difference in voltage across the condenser $C_2$ between the active and inactive states.

Other typical circuit constants that have been employed successfully in the counter of Fig. 5 are tabulated below:

$R_5=27,000\omega$
$C_4=0.25\ \mu F$
$R_6=150,000\omega$
$C_6=10\ \mu\mu F$
$C_5=0.004\ \mu F$ The rectifiers F, K and M may all be in the form of germanium diodes, such as type 1N34 or type 1N56. The rectifiers F are generally in the form of a pair of such diodes connected in series. The source rectifiers K are generally selected to have high back resistances of 0.5 megohm or more.

The output impedance of the pulse source Q is made low say about 500 ohms or less. In addition, the secondary winding of the radio-frequency supply had a very low impedance since the supply was regulated.

With this particular circuit a potential of 40 volts is developed across the resistor $R_5$ when an alternating voltage of 50 volts peak value is developed across condenser $C_2$. Thus when a resonant circuit is active a high voltage of 40 volts is developed across the resistor $R_5$ but when the resonant circuit is inactive a low voltage of about 2 volts is developed across the resistor $R_5$.

With such an arrangement, it is found that accurate counting could be obtained if the pulses had an amplitude anywhere within a wide range from 20 volts to 50 volts, and a pulse duration between about 2 $\mu$sec. to 10 $\mu$sec. Furthermore, it was found that accurate counting could be obtained for pulse rates that varied from zero to about 50 kc. p.s.

Figure 9:
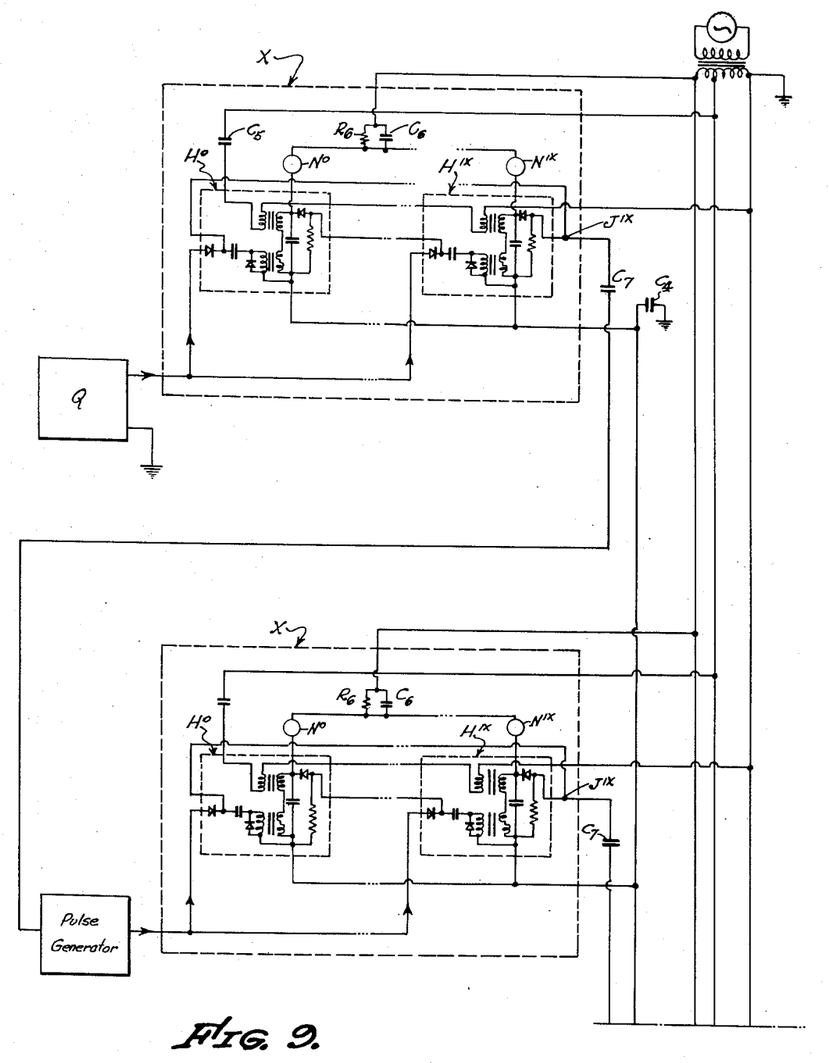
Fig. 9 is a block diagram of a counter embodying this invention.

In order to count to a higher number than 10, a series of scale-of-ten ring circuits of the type illustrated in Fig. 5 are arranged as shown for example in Fig. 9, so that the output of each except the last supplies pulses to the next in order. Here, by way of example, all the primary windings $P_1$ of each decade unit X, together with the associated frequency compensating condenser $C_5$ constitute a separate circuit and each of these separate circuits in the respective decade units are connected in parallel across the same part of the secondary winding $S_5$ in the output of the regulated voltage supply S. Likewise, the sets of glow tubes N of each decade unit are supplied voltage from the same point of the secondary winding $S_5$ through a corresponding resistor $R_6$. Furthermore, all of the bus wires U of the respective decade units are connected to a common voltage supply condenser $C_4$.

In order to count to numbers higher than 10, the junction $J^{ix}$ of the output bi-stable unit $H^{ix}$ of each decade unit except the last is connected through a coupling condenser $C_7$ to the input of a pulse generator Q and the output of this pulse generator is applied to the saturating winding of the input bi-stable unit H° of the next decade unit X in sequence.

It will be noted that only the positive going part of the pulse applied by any pulse source triggers the associated decade unit. For this reason, each pulse generator Q that is connected between the output of any decade unit and the input of the next decade unit is designed to produce a positive pulse at its output when a positive pulse is applied to its input. In this way, each time the 0-indicating or input bi-stable unit H° of each decade unit becomes active, a pulse is transmitted to the next following decade unit to increase the count there by one digit.

It will be noted that in the operation of the circuits of Figs. 3, 5 and 9, the resonant circuit that is connected to the input of each saturating winding of the next following resonant circuit acts as a gating circuit with respect to that next following resonant circuit. Thus, a D.-C. voltage generated at the output of each resonant circuit when it is active applies a voltage to the rectifier K connected to the saturating winding $P_2$ of the next following resonant circuit in such a way that the next following resonant circuit can become active only when the preceding resonant circuit connected thereto is active. This arrangement is particularly useful when the number of resonant circuits connected together in a ring exceeds two and when only one resonant circuit is to be active at a time. However, a different gating system can be used in some other arrangements.

Figure 10:
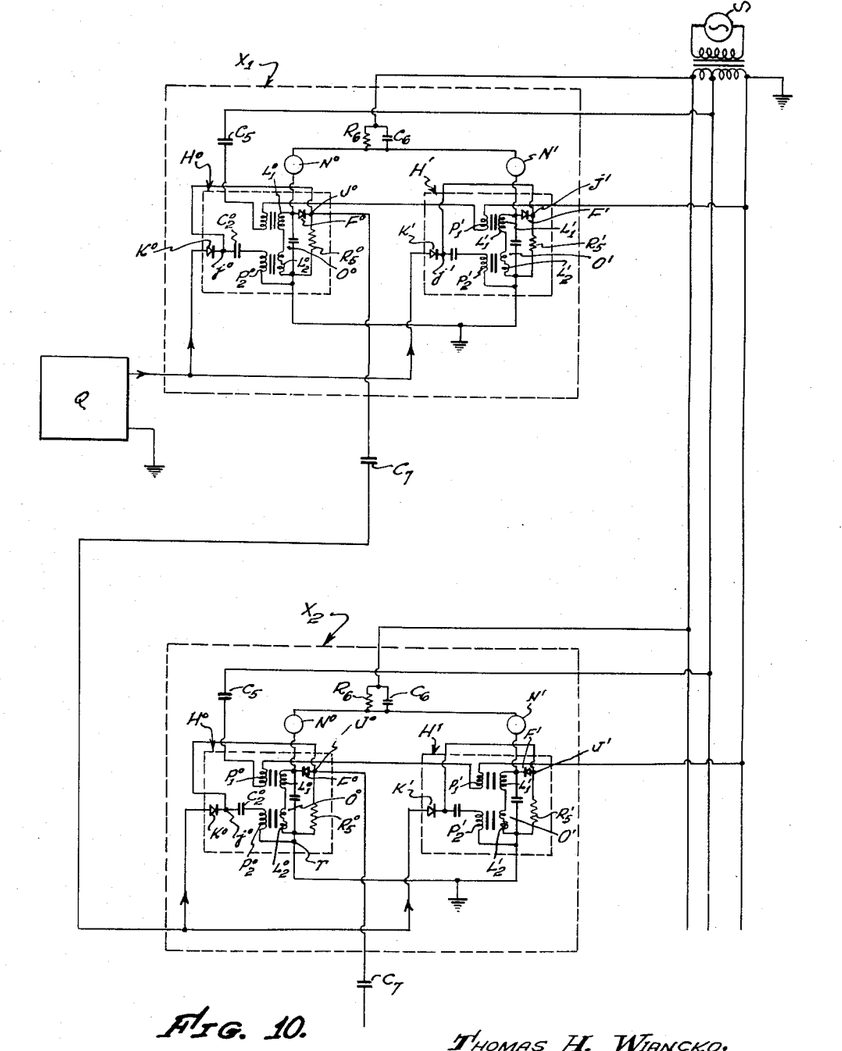
Fig. 10 is a block diagram of another counter embodying this invention.

In Fig. 10, there is illustrated a binary counter comprising a plurality of binary stages $X_1$, $X_2$, etc., only the first two stages $X_1$ and $X_2$ being shown in detail. This binary counter is very similar to the decade counter illustrated in Fig. 9, except for the gating arrangement and other changes made possible by virtue of the use of the different gating arrangement. The first binary stage $X_1$ is supplied with pulses to be counted from a source Q and a connection is provided between the first stage and the second stage to cause the indication of the second stage to increase by one digit each time the indication in the first stage returns to zero and similar connections are employed for operating the succeeding stages. The A.C. voltage applied from the source S to each stage $X_1$ and $X_2$ is of such value that one and only one of the resonant circuits can be active.

Each of the binary stages X includes a "zero" section, including a resonant circuit O° and a "ones" section H' including a resonant circuit O'. In this case the negative terminal of the rectifier circuit of each resonant circuit is grounded and the junction J between each rectifier F and the resistor $R_5$ connected thereto is connected to the junction $j$ between the rectifier K and condenser $C_2$. More particularly referring to the zero section of either stage $X_1$ or $X_2$ shown, the junction J° between the rectifier F° and the resistor $R_5°$ is connected to the junction $j°$ between the rectifier K° and condenser $C_2°$. Likewise, referring to the second section of each stage $X_1$ and $X_2$ the junction J' between the rectifier F' and the resistor $R_5'$ is connected to the junction $j'$ between the rectifier K' and condenser $C_2'$.

To understand the operation of the counter of Fig. 10 assume by way of example that initially the counter is indicating a count of 00. Thus initially the zero resonant circuit O° of each stage X is active and the ones resonant circuit O' of each stage is inactive. The glow tubes N° connected to the outputs of the zero sections H° are on while the glow tubes N' at the output of the ones sections are off. Under these circumstances, a relatively high positive potential of 38 volts appears at the junction J° of each active section, and this voltage is applied directly to the junction $j°$ between the rectifier K° and the condenser $C_2°$. At the same time a relatively low positive voltage of only 2 volts appears at the junction J' of each inactive stage, thus applying a low voltage to the corresponding junction $j'$ between the rectifier K' and the condenser $C_2'$ of that section. Accordingly, when the next positive pulse is applied from the source Q to the input of the first stage $X_1$ a positive pulse is applied to the saturating winding $P_2'$ of the ones section O', but no pulse is applied to the saturating winding $P_2°$ of the zero section thereof. When the "ones" section H' of the first stage becomes active, the voltage at junctions J' and $j'$ is raised to +38 volts. The activation of the ones section O' forces the zero section O° to become inactive. When this occurs the voltage at the junctions J° and j° falls to +2 volts.

When a second positive pulse is applied to the first stage $X_1$, its zero section O° becomes active and its ones section O' becomes inactive. The positive pulse generated at the junction J° of the first stage at the time that its zero section becomes active is applied through a condenser $C_7$ to the input of the second stage $X_2$ causing the inactive section of that stage to become active and the active section of that stage to become inactive. In a similar way each later stage is operated by the next preceding stage. Thus, successive pulses applied to the counter from the source Q are indicated in the binary counter of Fig. 10.

In order to assure the application of saturating fields to the cores of the saturable inductors $L_2$ in the counter of Fig. 10, the exciting windings $P_2$ thereof are wound with 5000 turns instead of 1000 turns as in the units of Figs. 3, 5 and 9.

It is apparent from the foregoing discussion that each section H of the counter of Fig. 10 is self-gating and that when a resonant circuit is active, the gate leading to its saturating winding $P_2$ is closed and when it is inactive the gate is open. In this case, the voltage which determines whether the gate at the input of a resonant circuit is open or closed is produced by the resonant circuit itself instead or by some other resonant circuit as is the case with the circuits of Figs. 3, 5 and 9.

It is to be noted that rectifiers M have been omitted from the input circuits of the binary counter. They are not required in this circuit because there is no time during which all of the sections of any stage become inactive even momentarily as in the case with the ring circuits of Figs. 5 and 9.

It is to be noted that if three or more self-gating resonant circuits are connected in a ring and their saturating windings are fed pulses from different sources as in the circuit of Fig. 3, any inactive stage may be rendered active by applying a positive pulse thereto and in that case the inactive stage becomes active.

It is to be noted that if all of the sections of the device of Fig. 3 are supplied pulses from a common source Q instead of from separate sources, this device too would operate as a counter. In this particular case, reliable sequential action can be obtained because of the fact that the D.C. voltage at the output of each active stage is maintained momentarily by the condenser $C_3$ in its output during the time that the next following stage is becoming active. However, the time required for an inactive stage to become active and the next preceding active stage to become inactive is longer than when the systems illustrated in Figs. 5, 9 and 10 are employed. It is thus apparent that the counters of Figs. 5, 9 and 10 can be employed to count at a higher rate than a counter formed by supplying pulses from a common source to the resonant circuits of the device of Fig. 3.

From the foregoing description of the invention, it will be noted that two different factors have been employed to control the activation and de-activation of the resonant circuits. One factor involves the fact that when a resonant circuit is rendered active by the application of a saturating current to its saturating winding, all the other resonant circuits are forced to be inactive by virtue of the fact that the total voltage applied across the primary windings of the non-saturating transformers is so controlled that only one resonant circuit can be active at a time. This type of action occurs in the circuits of Figs. 3, 5, 9 and the binary circuit of Fig. 10. Another factor involves the transmission of a voltage pulse through a gating circuit to an inactive resonant circuit in order to activate that resonant circuit by the resultant short-circuiting action across it. This type of action occurs in the counters of Figs. 5 and 9. Where both factors contribute to the activation and de-activation of different sections of a counter as is the case with the counters of sections 5 and 9, wherein all of the resonant circuits become inactive momentarily, the rectifiers M assure that only the proper rectifier circuit will next become active. In any event by employing the resonant circuits described herein a large difference exists between the output voltage in the active state and the output voltage in the inactive state.

As employed herein, the term "saturable inductor" is intended to signify a non-linear inductor, the effective inductance of which varies with the magnitude of the magnetic field present in its core, it being understood however that the most effective way to apply the invention is to employ alternating currents that drive the cores of the saturable inductors beyond saturation when in the active state.

It will be noted that negative pulses may be employed to trigger the resonant circuits if the polarity of the rectifiers F, K and M are reversed, provided that the polarity of battery B, if one is present, is also reversed. However, if no such battery is present the condenser $C_4$ is automatically charged in the reverse direction. In such a case, if negative pulses are being employed to trigger the resonant circuits the polarity of pulses generated by a pulse generator that connects the output of one decade unit with another in the circuit of Fig. 9 should also be reversed.

While the invention has been described more or less in detail with respect to specific forms thereof, it will be obvious that the invention is not limited thereto, but that it is capable of a variety of embodiments. Various changes which will now suggest themselves to those skilled in the art may be made in the material, form, details of construction, connection and arrangement of the elements, without departing from the scope of the invention.

Thus even though the invention has been disclosed with reference to its best known embodiments in which the primary windings of the non-saturating transformers are connected in series across a regulated voltage supply, it will be understood that the invention could also be applied by connecting each of the secondary windings in parallel through an impedance and supplying them with current from a regulated or constant current source. It is, therefore, intended to cover not only the specific forms of the invention which have been described herein, but all forms thereof which are within the scope of the appended claims.

The invention claimed is:

1. In combination: a resonant circuit comprising a linear inductor, a saturable inductor including a magnetic core, and a condenser connected in series in closed loop; a source of A.C. voltage coupled to said closed loop, said resonant circuit having two stable states of operation and an unstable transition region therebetween at the frequency of said source, said two stable states of operation being characterized by high and low amplitudes of voltage respectively, at the frequency of said source, in said resonant circuit whereby said circuit has an active state in which the amplitude of the A.C. current in said loop is high and an inactive state in which the amplitude of said A.C. current is low; means for changing said resonant circuit through said unstable transition region between said two stable states comprising means for selectively saturating the core of said saturable inductor momentarily to change said resonant circuit from an inactive state to an active state, thereby changing the amplitude of said A.C. current from such a low value to such a high value if said amplitude is low just prior to the time that said core is saturated; said means for changing including means for selectively reducing the current in said loop to change said resonant circuit from an active state to an inactive state, thereby changing the amplitude of said A.C. current from such a high value to such a low value if said circuit is active at the time said current is reduced; and a utilization device controlled by said resonant circuit in accordance with the amplitude of A.C. voltage therein.

2. In combination: a resonant circuit comprising a linear inductor, a saturable inductor including a core, and a condenser connected in series in closed loop; an A.C. source for applying an A.C. voltage in said closed loop, said A.C. source having a preselected A.C. current output of sufficiently large magnitude that the resonance curve of said resonant circuit includes at least two distinct stable operating conditions separated by an unstable transition region at the frequency of said source, whereby said circuit has an active state in which the amplitude of the A.C. current in said loop is high and an inactive state in which the amplitude of said A.C. current is low; means for saturating the core of said saturable inductor momentarily to change said resonant circuit from an inactive state to an active state, thereby changing the amplitude of said A.C. current from such a low value to such a high value if said amplitude is low just prior to the time that said core is saturated; means for reducing the current in said loop to change said resonant circuit from an active state to an inactive state, thereby changing the amplitude of said A.C. current from such a high value to such a low value if said circuit is active at the time said current is reduced; means including a rectifier connected across said condenser to produce a D.C. voltage corresponding to the A.C. voltage across said condenser; and a utilization device controlled by said D.C. voltage.

3. In combination: a resonant circuit comprising a linear inductor, a saturable inductor, and a condenser connected in series in closed loop, said resonant circuit having a voltage versus frequency characteristic which includes at least two distinct stable voltages for each frequency applied thereto within a selected range of frequencies, said saturable inductor being in the form of a secondary winding on a saturable core that also has a saturating winding thereon; means for applying an A.C. voltage in said closed loop, the frequency of said A.C. voltage means being within said selected range of frequencies whereby said circuit has an active state in which the amplitude of the A.C. voltage in said loop is high and an inactive state in which the amplitude of said A.C. voltage is low; means for switching said resonant circuit between its said two distinct stable voltages comprising first means for selectively applying a current pulse to said saturating winding to change the state of operation of said circuit from one to the other of its stable states; as well as second means for selectively reducing the current in said loop to change the condition of said core from said other to said one of its stable states; and a utilization device controlled by said resonant circuit in accordance with the magnitude of A.C. voltage therein.

4. A unit for use in electrical circuits with a source of A.C. voltage comprising: a transformer having a primary winding and a secondary winding, circuit terminals for connecting said primary winding to such a source to induce a voltage across said secondary winding; a saturable reactor comprising a secondary winding and a saturating winding on a saturable core; a condenser connected in series with said secondary windings to form a resonant circuit exhibiting bistable resonant states, separated by an unstable transition region, at the frequency of said source, said bistable resonant states comprising a first state in which the core of said saturable reactor remains unsaturated and the amplitude of the A.C. voltage in said circuit is low, and a second state in which the core of said saturable reactor saturates and the amplitude of the A.C. voltage in said circuit is high when such a source of A.C. voltage is connected to said first-mentioned circuit terminals; circuit terminals for connecting a pulse source across said saturating winding; and circuit terminals for connecting a utilization circuit across said capacitor.

5. A unit for use in electrical circuits with a source of A.C. voltage comprising: a transformer having a primary winding and a secondary winding, circuit terminals for connecting said primary winding to such a source to induce a voltage across said secondary winding; a saturable reactor comprising a secondary winding and a saturating winding on a saturable core; a condenser connected in series with said secondary windings to form a resonant circuit, said resonant circuit having bistable resonant states, at the frequency of said source, characterized respectively by an inactive state in which the core of said saturable reactor remains unsaturated and the amplitude of the A.C. voltage in said circuit is low, and by an active state in which the core of said saturable reactor saturates and the amplitude of the A.C. voltage in said circuit is high; circuit terminals for connecting a pulse source across said saturating winding; and circuit terminals for connecting a utilization circuit to said resonant circuit; the Q of the secondary winding of said transformer being relatively high and the Q of the secondary winding of said saturable reactor being relatively low, and the inductance $L_1$ of the secondary winding of said transformer and the inductance $L_2$ of the secondary winding of said saturable reactor satisfying the following relationship: $L_2 < L_1$ when the resonant circuit is active, $L_2 > L_1$ when the resonant circuit is inactive.

6. In a binary circuit: first and second resonant circuits, each comprising a linear inductor, a saturable inductor, and a condenser connected in series in a closed loop; means for applying an A.C. voltage in said closed loops, whereby each of said resonant circuits has an active state in which the amplitude of the A.C. current in said loop is high and an inactive state in which the amplitude of said A.C. current is low; means for rendering said first resonant circuit active; means for rendering said second circuit inactive; a pulse source; and means operative only when said first resonant circuit is active for transmitting a pulse from said source to said first resonant circuit to render said first resonant circuit inactive and for simultaneously transmitting a pulse to said saturable inductor to saturate the same to render said second resonant circuit active.

7. In an electric circuit: first and second resonant circuits, each comprising a linear inductor, a saturable inductor, and a condenser connected in series in closed loop, the saturable inductor of said second resonant circuit being in the form of a secondary winding on a saturable core that also has a saturating winding thereon; means for applying an A.C. voltage in said closed loops, whereby each of said circuits has an active state in which the amplitude of the A.C. current in said loop is high and an inactive state in which the amplitude of said A.C. current is low; means for rendering said first resonant circuit active; means for rendering said second circuit inactive; a pulse source; and means operative only when said first resonant circuit is active for transmitting a pulse from said source to said first resonant circuit to render said first resonant circuit inactive, said means also being operative only when said first resonant circuit is active for transmitting a pulse from said source to said saturating winding to render said second resonant circuit active.

8. In an electric circuit: first and second resonant circuits, each comprising a linear inductor, a saturable inductor, and a condenser connected in series in closed loop, each said linear inductor comprising the secondary winding of a transformer having a primary winding, the saturable inductor of said second resonant circuit being in the form of a secondary winding on a saturable core that also has a saturating winding thereon; means for connecting a source of alternating current in series with said primary windings for inducing voltages in said closed loops whereby each of said resonant circuits has an active state in which the amplitude of the A.C. current in the corresponding loop is high and an inactive state in which the amplitude of the A.C. current in said corresponding loop is low; means for rendering said first resonant circuit active; means for rendering said second circuit inactive; a pulse source; and means operative only when said first resonant circuit is active and said second resonant circuit is inactive for transmitting a pulse from said source to said saturating winding to render said second resonant circuit active.

9. In an electric circuit: first and second resonant circuits, each comprising a linear inductor, a saturable inductor, and a condenser connected in series in a closed loop, each said linear inductor comprising the secondary winding of a transformer having a primary winding, the saturable inductor of said second resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude tube of the A.C. current in the corresponding loop is high and an inactive state in which the amplitude of the A.C. current in said corresponding loop is low; rectifying means connected to one of said resonant circuits to produce a D.C. voltage having a magnitude corresponding to the amplitude of said A.C. voltage; means for rendering said first resonant circuit active; means for rendering said second circuit inactive; a pulse source; means controlled by said rectifying means for applying a current from said pulse source to said saturating winding only when said first resonant circuit is active whereby said second resonant circuit is changed from an inactive state to an active state; and means for rendering said first resonant circuit inactive when said second resonant circuit is rendered active.

10. In an electric circuit: first and second resonant circuits, each comprising a linear inductor, a saturable inductor, and a condenser connected in series in a closed loop, each said linear inductor comprising the secondary winding of a transformer having a primary winding, the saturable inductor of said second resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude of the A.C. current in the corresponding loop is high and an inactive state in which the amplitude of the A.C. current in said corresponding loop is low; rectifying means connected to each of said resonant circuits to produce a D.C. voltage having a magnitude corresponding to the amplitude of the A.C. current in its output; means for rendering said first resonant circuit active; means for rendering said second circuit inactive; a pulse source; means controlled by said rectifying means for applying a current from said pulse source to said saturating winding only when said second resonant circuit is inactive whereby said second resonant circuit is changed from an inactive state to an active state; and means also controlled by said rectifying means when said first resonant circuit is active for rendering first resonant circuit inactive.

11. In an electric circuit: first and second resonant circuits, each comprising a linear inductor, a saturable inductor, and a condenser connected in series in a closed loop, each said linear inductor comprising the secondary winding of a transformer having a primary winding, the saturable inductor of said second resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude of the A.C. current in the corresponding loop is high and an inactive state in which the amplitude of the A.C. current in said corresponding loop is low; rectifying means including a first rectifier connected across the condenser of said first resonant circuit to produce a D.C. voltage having a magnitude corresponding to the amplitude of said A.C. current; means for rendering said first resonant circuit active; means for rendering said second circuit inactive; a pulse source; a second rectifier connected between said pulse source and said first rectifier and biased by the output of said second rectifying means to transmit current only when said first resonant circuit is active; means for applying part of a pulse of current passing through said second rectifier to said first resonant circuit whereby said first resonant circuit is changed from an active state to an inactive state; and means for applying part of a pulse of current passing through said second rectifier to said saturating winding whereby said second resonant circuit is changed from an inactive state to an active state.

12. In an electric circuit; a plurality of resonant circuits arranged sequentially in a ring, each resonant circuit comprising a linear inductor, a saturable inductor, and a condenser connected in series in a closed loop, each said linear inductor comprising the secondary winding of a transformer having a primary winding, the saturable inductor of each said resonant circuit being in the form of a secondary winding on a saturable core that also has a saturating winding thereon; means for connecting a source of alternating current with said primary windings for inducing voltages in said closed loops, whereby each of said resonant circuits has an active state in which the amplitude of the A.C. current in the corresponding loop is high and an inactive state in which the amplitude of the A.C. current in said corresponding loop is low, the value of said current being such that only one resonant circuit is active at a time; a plurality of rectifying means associated with the respective resonant circuits for producing in each rectifying means a D.C. voltage having a magnitude corresponding to the amplitude of the A.C. current in the corresponding resonant circuit; pulse source means for applying pulses to said saturating windings; means controlled by said rectifying means for applying a current pulse from said pulse source means to the saturating winding associated with any resonant circuit only when inactive, whereby said any resonant circuit becomes active.

13. In an electric circuit: a plurality of resonant circuits arranged sequentially in a ring, each resonant circuit comprising a linear inductor, a saturable inductor, and a condenser connected in series in a closed loop, each said linear inductor comprising the secondary winding of a transformer having a primary winding, the saturable inductor of each resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude of the A.C. current in the corresponding loop is high and an inactive state in which the amplitude of the A.C. current in said corresponding loop is low; a plurality of rectifying means associated with the respective resonant circuits for producing a D.C. voltage having a magnitude corresponding to the amplitude of the A.C. current in the corresponding resonant circuit; pulse source means for applying pulses to said saturating windings; means controlled by said rectifying means for applying a current pulse from said pulse source to the saturating winding associated with any resonant circuit only when the next prior resonant circuit in the ring is active, whereby said any resonant circuit becomes active; and means also controlled by said rectifying means for applying a voltage pulse to the rectifying means associated with the active resonant circuit for rendering said active resonant circuit inactive.

14. In an electric circuit: a plurality of resonant circuits arranged sequentially in a ring, each resonant circuit comprising a linear inductor, a saturable inductor, and a condenser connected in series in a closed loop, each said linear inductor comprising the secondary winding of a transformer having a prmiary winding, the saturable inductor of each resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude of the A.C. current in the corresponding loop is high and an inactive state in which the amplitude of the A.C. current in said corresponding loop is low; a plurality of rectifying means associated with the respective resonant circuits for producing a D.C. voltage having a magnitude corresponding to the amplitude of the A.C. current in the corresponding resonant circuit; a pulse source; a gating circuit connected with each said saturating winding; means for applying pulses from said pulse source to each of said gating circuits; means controlled by said rectifying means for rendering a gating circuit operative to apply a pulse to the associated saturating winding only when the next prior resonant circuit in the ring is active, whereby the resonant circuit controlled by said saturating winding becomes active; and means also controlled by said rectifying means for applying a voltage pulse from said pulse source to the active resonant circuit for rendering said active resonant circuit inactive.

15. In an electric circuit: a plurality of resonant circuits arranged sequentially in a ring, each resonant circuit comprising a linear inductor, a saturable inductor, and a condenser connected in series in a closed loop, each said linear inductor comprising the secondary winding of a transformer having a primary winding, the saturable inductor of each resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude of the A.C. current in the corresponding loop is high and an inactive state in which the amplitude of the A.C. current in said corresponding loop is low, and for rendering only one resonant circuit active at a time; a rectifying means associated with each resonant circuit for producing a D.C. voltage having a magnitude corresponding to the amplitude of the A.C. current in the corresponding resonant circuit; a pulse source; a rectifier connected across each saturating winding; and means controlled by said rectifying means for applying a relatively large current pulse to a saturating winding only when the next prior resonant circuit in the ring is active and relatively small or zero current pulses to the remaining saturating windings, whereby the resonant circuit next following the active resonant circuit becomes active.

16. In an electric circuit: a plurality of resonant circuits arranged sequentially in a ring, each resonant circuit comprising a linear inductor, a saturable inductor, and a condenser connected in series in a closed loop, each said linear inductor comprising the secondary winding of a transformer having a primary winding, the saturable inductor of each resonant circuit being in the form of a secondary winding on a saturable core that also has a saturating winding thereon; means for connecting a source of alternating current with said primary windings for inducing voltages in said closed loops whereby each of said resonant circuits has an active state in which the amplitude of the A.C. current in the corresponding loop is high and an inactive state in which the amplitude of the A.C. current in said corresponding loop is low; a rectifying means associated with each resonant circuit for producing a D.C. voltage having a magnitude corresponding to the amplitude of the A.C. current in the corresponding resonant circuit; a pulse source; a rectifier connected across each saturating winding; means controlled by said rectifying means for applying a voltage pulse from said source to the rectifying means associated with an active resonant circuit for rendering said active resonant circuit inactive; and means controlled by said rectifying means for simultaneously applying a relatively large current pulse to a saturating winding only when the next prior resonant circuit in the ring is active, and relatively small or zero current pulses to the remaining saturating windings, whereby the resonant circuit next following the active resonant circuit becomes active.

17. In an electric circuit: a plurality of resonant circuits arranged in sequence, each resonant circuit comprising a saturable inductor in the form of a secondary winding on a saturable core that also has a saturating winding thereon; means for applying alternating current to said resonant circuits, whereby each of said resonant circuits has an active state in which the amplitude of the A.C. current therein is high and an inactive state in which the amplitude of the A.C. current therein is low and for rendering only one of said resonant circuits active at a time; a pulse source; a rectifier connected across each saturating winding; and means controlled by large currents produced in an active resonant circuit and small currents produced in inactive resonant circuits for applying a relatively large current pulse to a saturating winding of the next resonant circuit in the sequence after the active resonant circuit, and relatively small current pulses to the remaining saturating windings, whereby the resonant circuit next following the active resonant circuit becomes active.

18. In an electric circuit: a plurality of resonant circuits arranged in sequence, each resonant circuit comprising a saturable inductor in the form of a secondary winding on a saturable core that also has a saturating winding thereon; means for applying alternating current to said resonant circuits, whereby each of said resonant circuits has an active state in which the amplitude of the A.C. current therein is high and an inactive state in which the amplitude of the A.C. current therein is low, and for rendering only one of said resonant circuits active at a time; a rectifying means associated with each resonant circuit for producing a D.C. voltage having a magnitude corresponding to the amplitude of the A.C. current in the corresponding resonant circuit; a pulse source; a rectifier connected across each saturating winding; and means controlled by said rectifying means for applying a relatively large current pulse to a saturating winding only when the next prior resonant circuit in the sequence is active and relatively small or zero current pulses to the remaining saturating windings, whereby the resonant circuit next following the active resonant circuit becomes active.

19. In an electric circuit: a gaseous discharge lamp; means for applying both a D.C. voltage and an A.C. voltage to said lamp simultaneously; a bi-stable circuit having a pair of stable conditions; and means for varying the magnitude of said A.C. voltage in accordance with said conditions to energize or de-energize said lamp in accordance therewith.

20. In an electric circuit: a gaseous discharge lamp characterized by a deionization time; means for applying to said lamp a D.C. voltage and also an A.C. voltage having a frequency large compared with the reciprocal of said deionization time; a bi-stable circuit having a pair of stable conditions; and means for varying the magnitude of said A.C. voltage in accordance with said conditions to energize or de-energize said lamp in accordance therewith.

21. In an electric circuit: a plurality of bi-stable resonant circuits; a gaseous discharge lamp associated with each resonant circuit; means for operating said bi-stable resonant circuits so that a high or low A.C. voltage is developed by each circuit according to whether it is active or inactive; and means for applying a D.C. voltage to each lamp and also the A.C. voltage developed by the associated resonant circuit whereby the respective lamps are illuminated or dark, according to the condition of the corresponding resonant circuits.

22. In an electric circuit: a ring of resonant circuits, each comprising a linear inductor, a saturable inductor, and a condenser connected in series in a closed loop, each said linear inductor comprising the secondary winding of a transformer having a primary winding, the saturable inductor of each of said resonant circuits being in the form of a secondary winding on a saturable core that also has a saturating winding thereon; means for connecting a source of alternating voltage with said primary windings for inducing voltages in said closed loops whereby each of said resonant circuits has an active state in which the amplitude of the A.C. current in the corresponding loop is high and an inactive state in which the amplitude of the A.C. current in said corresponding loop is low, the value of said voltage being such that only one of said resonant circuits is active at a time; rectifying means connected to each of said resonant circuits to produce a D.C. voltage having a magnitude corresponding to the amplitude of said A.C. current in its output; a pulse source; and means controlled by said rectifying means for applying a current to a saturating winding of a resonant circuit only when it is in an inactive state to render it active.

23. In an electric circuit: a ring of resonant circuits, each comprising a linear inductor, a saturable inductor, and a condenser connected in series in a closed loop, each said linear inductor comprising the secondary winding of a transformer having a primary winding, the saturable inductor of said second resonant circuit being in the form a secondary winding on a saturable core that also has a saturating winding thereon; means for connecting a source of alternating voltage with said primary windings for inducing voltages in said closed loops whereby each of said resonant circuits has an active state in which the amplitude of the A.C. current in the corresponding loop is high and an inactive state in which the amplitude of the A.C. current in said corresponding loop is low, the value of said voltage being such that only one of said resonant circuits is active at a time; rectifying means connected to each of said resonant circuits to produce a D.C. voltage having a magnitude corresponding to the amplitude of said A.C. current in its output; a pulse source; and means controlled by the rectifying means connected to each resonant circuit in the ring for applying a current to the saturating winding of the next resonant circuit in the ring only when said each resonant circuit is active whereby said next resonant circuit is changed from an inactive state to an active state.

24. In an electric circuit: a ring of resonant circuits, each comprising a linear inductor, a saturable inductor, and a condenser connected in series in a closed loop, each said linear inductor comprising the secondary winding of a transformer having a primary winding, the saturable inductor of said second resonant circuit being in the form of a secondary winding on a saturable core that also has a saturating winding thereon; means for connecting a source of alternating voltage with said primary windings for inducing voltages in said closed loops whereby each of said resonant circuits has an active state in which the amplitude of the A.C. current in the corresponding loop is high and an inactive state in which the amplitude of the A.C. current in said corresponding loop is low, the value of said voltage being such that only one of said resonant circuits is active at a time; rectifying means connected to each of said resonant circuits to produce a D.C. voltage having a magnitude corresponding to the amplitude of said A.C. current in its output; a pulse source; and means controlled by the rectifying means connected to each resonant circuit for applying a current to the saturating winding of said resonant circuit only when said resonant circuit is inactive whereby said each resonant circuit is changed from an inactive state to an active state.

References Cited in the file of this patent

UNITED STATES PATENTS

| | | |
|---|---|---|
| 1,804,859 | Crouse | May 12, 1931 |
| 2,025,471 | Osborne | Dec. 24, 1935 |
| 2,231,584 | Lord | Feb. 11, 1941 |
| 2,247,728 | Langer | July 1, 1941 |
| 2,430,547 | Anderson | Nov. 11, 1947 |
| 2,458,277 | Lark | Jan. 4, 1949 |
| 2,717,335 | Sims | Sept. 6, 1955 |